United States Patent [19]

Heinrich et al.

[11] 4,438,489

[45] Mar. 20, 1984

[54] INTERRUPT PRE-PROCESSOR WITH DYNAMIC ALLOCATION OF PRIORITY LEVELS TO REQUESTS QUEUED IN AN ASSOCIATIVE CAM

[75] Inventors: Hans J. Heinrich, Kirchheim; Dieter Schütt, Munich, both of Fed. Rep. of Germany

[73] Assignee: International Business Machines Corp., Armonk, N.Y.

[21] Appl. No.: 272,606

[22] Filed: Jun. 11, 1981

[30] Foreign Application Priority Data

Sep. 27, 1980 [EP] European Pat. Off. ........ 80105870.2

[51] Int. Cl.³ .......................... G06F 9/00; G06F 9/46
[52] U.S. Cl. ...................................... 364/200; 365/49
[58] Field of Search ................... 364/200, 900; 365/49

[56] References Cited

U.S. PATENT DOCUMENTS

| | | | |
|---|---|---|---|
| 3,771,142 | 11/1973 | Minshull et al. | 364/900 |
| 3,905,023 | 9/1975 | Perpiglia | 364/200 |
| 4,115,850 | 9/1978 | Houston et al. | 364/200 |
| 4,172,284 | 10/1979 | Heinrich et al. | 364/200 |
| 4,188,670 | 2/1980 | Hsia | 365/49 |
| 4,296,475 | 10/1981 | Nederlof et al. | 364/900 |
| 4,319,321 | 3/1982 | Anastas et al. | 364/200 |
| 4,363,096 | 12/1982 | Comfort et al. | 364/200 |
| 4,374,413 | 2/1983 | Comfort et al. | 364/200 |

OTHER PUBLICATIONS

J. D. Erwin et al., Interrupt Processing with Queued Content-Addressable Memories, Fall Joint Computer Conference, (Nov. 1970), pp. 621–627.

*Primary Examiner*—James D. Thomas
*Assistant Examiner*—Archie E. Williams, Jr.
*Attorney, Agent, or Firm*—R. Lieber

[57] ABSTRACT

Interrupt requests of different priorities, presented by various interrupt sources (0 to 3), are transferred through control ST, in an associative storage and selection process, into preprocessing elements PE0 and PE1. These elements are variably assigned by controls ST to receive and preprocess requests of associated priority. The preprocessing generates a starting address of a program routine for servicing the respective request. This address is transferred to a common processor which executes the routine. The preprocessing elements can be structured to rapidly generate a succession of different starting addresses relative to several interrupt requests having the priority assigned to that element.

6 Claims, 12 Drawing Figures

FIG. 1

INTERRUPT REQUEST
PREPROCESSING ELEMENT

INTERRUPT PRE-PROCESSOR WITH DYNAMIC ALLOCATION OF PRIORITY LEVELS TO REQUESTS QUEUED IN AN ASSOCIATIVE CAM

BACKGROUND OF THE INVENTION

This invention relates to a priority level controlled interrupt handler unit for providing rapid handling of interrupt requests.

Rapid handling of interrupt requires is an important function in electronic data processing systems, particularly in systems for real time process control. For example, in process control systems, interrupt requests from many data sources, associated with sampled process variables, e.g. temperature, pressure, humidity, flow quantities, etc., may require rapid real time analysis potentially leading to changes in process execution.

Similarly, in other data processing applications requiring intermodule communication and control, rapid and adaptive processing of interrupt requests is desirable. For example housekeeping functions of structured programs performed in a multi-programming mode may require rapid and adaptive execution for optimal effectiveness.

Previous solutions for rapid servicing of interrupt requests are based on very expensive devices having complex circuit structures. Although such devices may provide requisite speeds of reaction they are unreliable due to their complicated structures.

For example, German Auslegeschrift No. 1 234 059, discloses a control device applicable to a multi-processing system for allocating priority levels to various computers of the system which mutually assign or re-assign programs or program parts having different priority levels. Each computer receives dynamically only the priority level of the program part it is processing at the moment, as long as it contains said particular program part. The system allocates program levels under control of a shift register structure which assigns priority levels in fixed associations with groups of shift stages. The assignment is conducted by shifting a computer address, or other identification number, in the shift register in the direction associated with increasing or decreasing priority levels, depending on the priority of the program part being executed in the addressed computer.

However, this device does not provide priority-controlled servicing of interrupt requests having differing priority, but merely allocates priority levels to different computers of a multi-processor system.

A priority level controlled interrupt handler device which is particularly applicable to data processing systems offering medium to lower range performance but requiring extremely fast reaction to interrupt requests, is disclosed in U.S. Pat. No. 4,172,284 granted Oct. 23, 1979 to H. J. Heinrich et al. That device includes a shift register having stages permanently and fixedly associated with specific interrupt levels (priority levels). The stages are connected to associated comparison units for comparing interrupt levels indicated in shifted interrupt requests with interrupt levels associated with respective stages. The device also contains a stack which buffers priority sublevel functions also contained in the interrupt requests. For controlling entries into this buffer, circuits are provided for testing the state of the stack (full, not full, empty, etc.). Each stage is also associated with a base address register and an instruction address register, the latter receiving an address formed by adding a function associated with the respective interrupt level to the base address. The address received by the instruction address register indicates the first instruction of an interrupt routine required for the execution or servicing of an interrupt request of a corresponding interrupt source.

Due to the serial transfer of interrupt requests through the shift register and the fixed allocation of interrupt levels to the stages of the shift register, and thus to the control facilities connected to the outputs of the shift register, the associated request servicing operations are too slow for many applications and not sufficiently adaptable.

SUMMARY OF THE INVENTION

Therefore an object of this invention is to provide interrupt handler apparatus having faster reaction speed and better adaptability than the apparatus characterized above. Embodiments and features of this apparatus are characterized in the accompanying claims.

A priority level controlled interrupt handler device in accordance with this invention is faster, more adaptable, and more reliable than the abovementioned known devices. Faster, because it stages the interrupt requests in an associative memory, which permits parallel access to requests and concurrently preprocesses requests of different interrupt (priority) levels in linear arrays of independent preprocessing elements.

Adaptability is achieved through dynamic allocation of level assignments to the preprocessing elements and through a masking feature disclosed herein.

In addition to increasing reaction speed, the subject hardware controlled preprocessing of interrupt requests also provides better reliability since it does not require program level switching, table lookup or other switching functions associated with prior systems.

Other significant advantages derive from the present direct generation of memory starting addresses for the interrupt handling routines, and the use of programmable base address registers to improve memory utilization.

Depending on the complexity of its combinatorial logic a preprocessing element in accordance with the present invention can be packaged on a plug-in card, or in a linear array of micro-processors.

The subject invention can support concurrent execution of plural interrupt routines relative to one interrupt level, if plural instruction address registers are provided for that level.

The foregoing and other objectives, features and advantages of the subject invention will best be understood from the following description when read in conjunction with the accompanying drawings.

DESCRIPTION OF A PREFERRED EMBODIMENT

Figure 1:
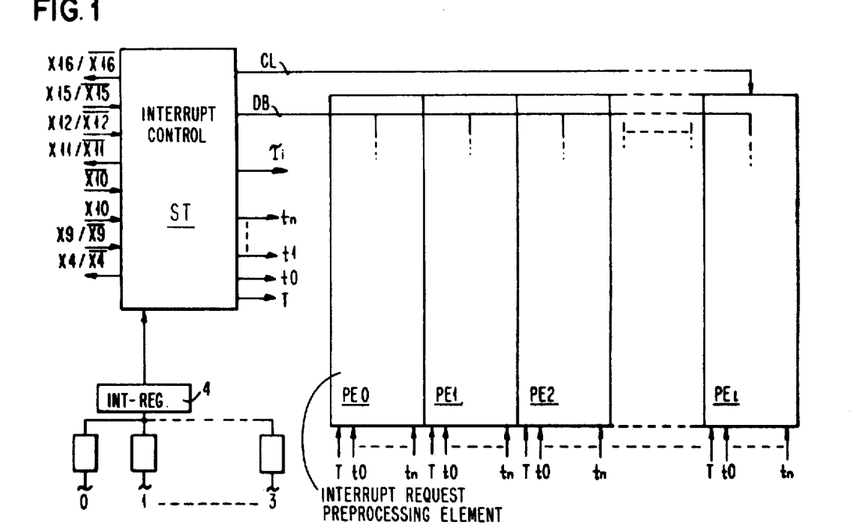
FIGS. 1, 2 and 2A contain block diagrams showing a priority level controlled interrupt device in accordance with the invention.

FIG. 1 illustrates, in block diagram form, a control unit for rapid and adaptable processing of interrupt requests from different interrupt sources. Each interrupt source comprises at least one register 0, 1, 2 or 3 in which it stages its formatted interrupt requests for presentation to control ST via common interrupt register 4.

Figure 3A:
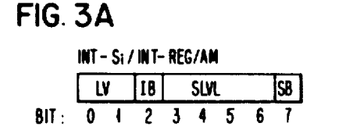
FIGS. 3A to 3D illustrate the data format of an interrupt request at various stages of handling in the subject device.

As shown in FIG. 3A, a formatted interrupt request comprises a field LV designating an interrupt level, a field SLVL designating an interrupt sub-level, an interrupt bit IB and a special bit SB. The level represented in LV corresponds to the priority level, or priority for short, which is assigned to the respective source by the system.

Requests having interrupt bit IB set to 1 require immediate servicing from the interrupt control ST. This is necessary because the interrupt requests are entered into control ST sequentially, via the common register 4, and distributed by ST sequentially to predetermined preprocessing elements PE0 to PE1, in accordance with their priorities. These elements pre-process the requests to convert request information into instruction addresses which designate locations of first instructions of routines for specific processing of respective request tasks in a not-shown single or multi-processor system.

As will be described in reference to FIG. 4, the operating system and circuits of control ST set interrupt level compare words into the processing elements PE which define the interrupt requests to be preprocessed by the respective elements, and also test whether the compare word is allowed, altered or unaltered by masking.

Figure 2:
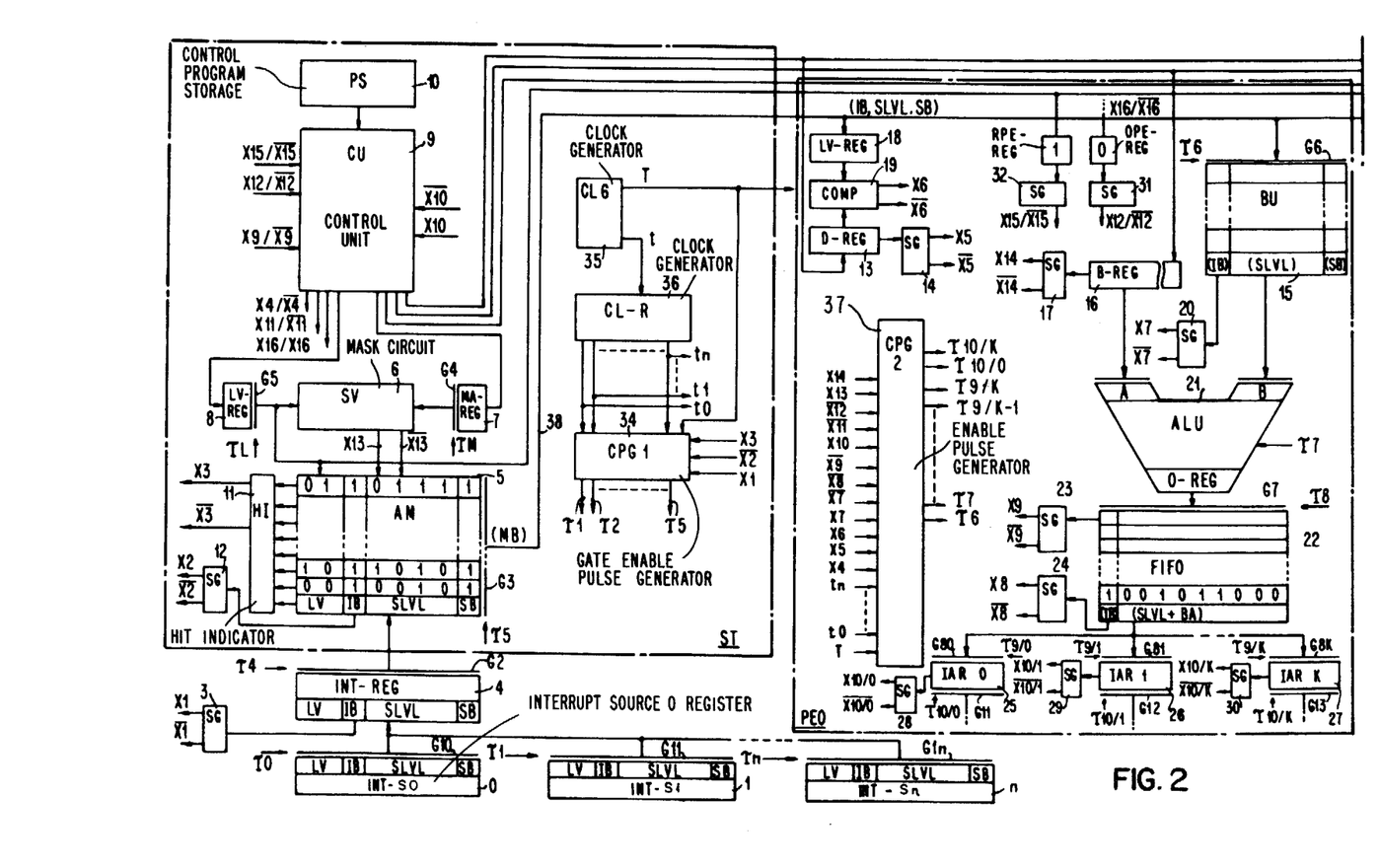
Figure 2A:
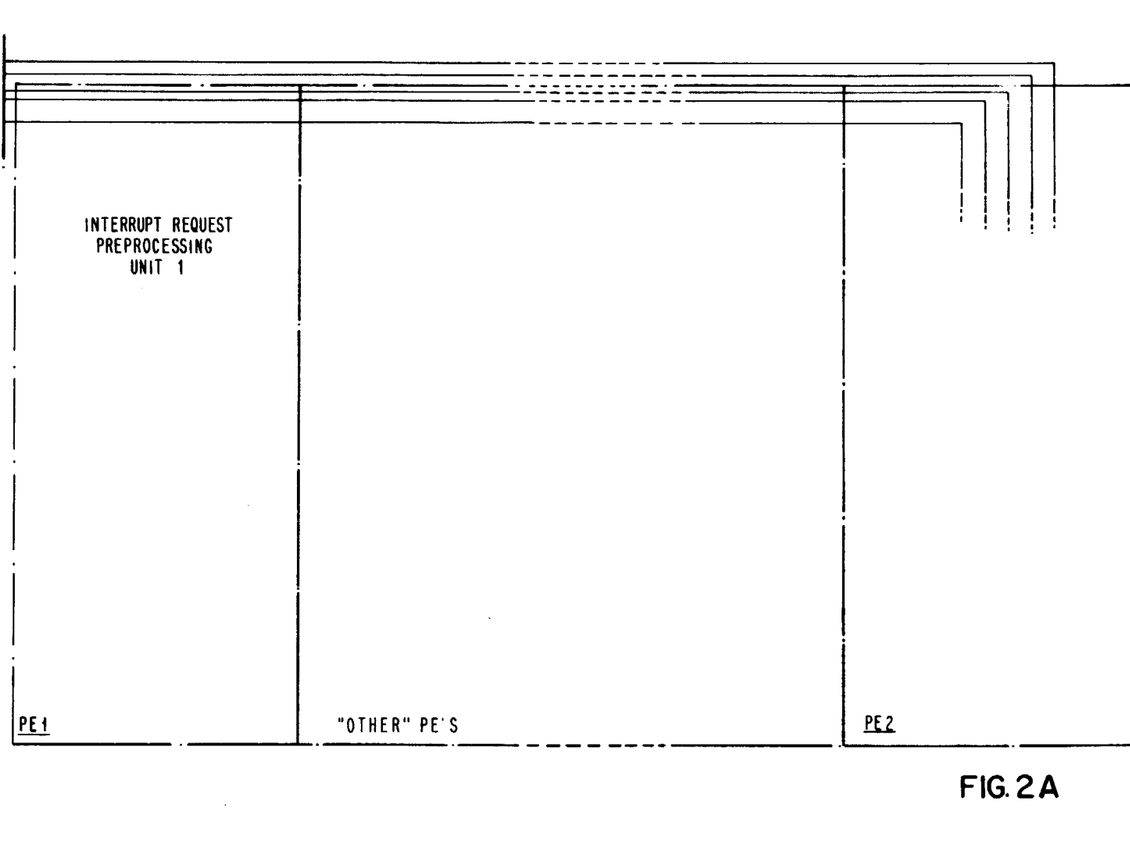

As shown in FIGS. 2, 2A, interrupt requests having various interrupt levels or priorities i are transferred from interrupt register 4 into associative memory (AM) 5 which is contained in control ST. At the same time, ST tests the availability of a processing element PEi associated with the respective priority. This test can be effected, for example, by determining for each processing element PEi having its D register 13 loaded with a value i representing this interrupt level, if associated buffers and storage stacks are not full.

If an element PEi is available for preprocessing interrupt requests of the respective priority i, specific parts of the i level requests, i.e. interrupt bit IB and interrupt sublevel field SLVL, are transferred in a byte-parallel mode from memory 5 to the buffer BU of that processing element. Such a PE is called a primary or standard PE. If no processing element is available the requests of priority i are transferred into the buffer BU of another processing element assigned to level i as a reserve processing element RPE.

As suggested previously, interrupt requests queued in the buffers BU of the processing elements PE are preprocessed, to form an initial routine address, by adding to a predetermined part of each request (i.e., the SLVL field) a base address, via an arithmetic and logic unit ALU in each processing element. Each routine address is transferred via a second buffer operated in accordance with the known FIFO algorithm into one or more instruction address registers IAR in the respective processing element for transmittal to a single or multi-processing system which performs the task routine. The logical combination of base address and interrupt sub-level functions can also be effected by means of other structures, e.g. through ORing.

When tasks for interrupt requests having higher priority than level i are not being processed the routines for interrupt level i can be performed. The initial addresses of these routines are in instruction address registers IARij. At such times, processing elements PEm which are processing interrupt requests of a lower interrupt level must be blocked. Interrupt routines of higher level cannot be interrupted.

Furthermore, if a reserve processing element RPEi assigned to the same interrupt level i has been activated the interrupt requests in the primary processing element PEi must first be processed before routines can be started for the interrupt requests in the reserve processing element.

After having processed all its interrupt routines, the primary processing element PEi is redesignated as the reserve processing element for level i, while the associated reserve processing element is designated as the primary processing element.

Figure 4:
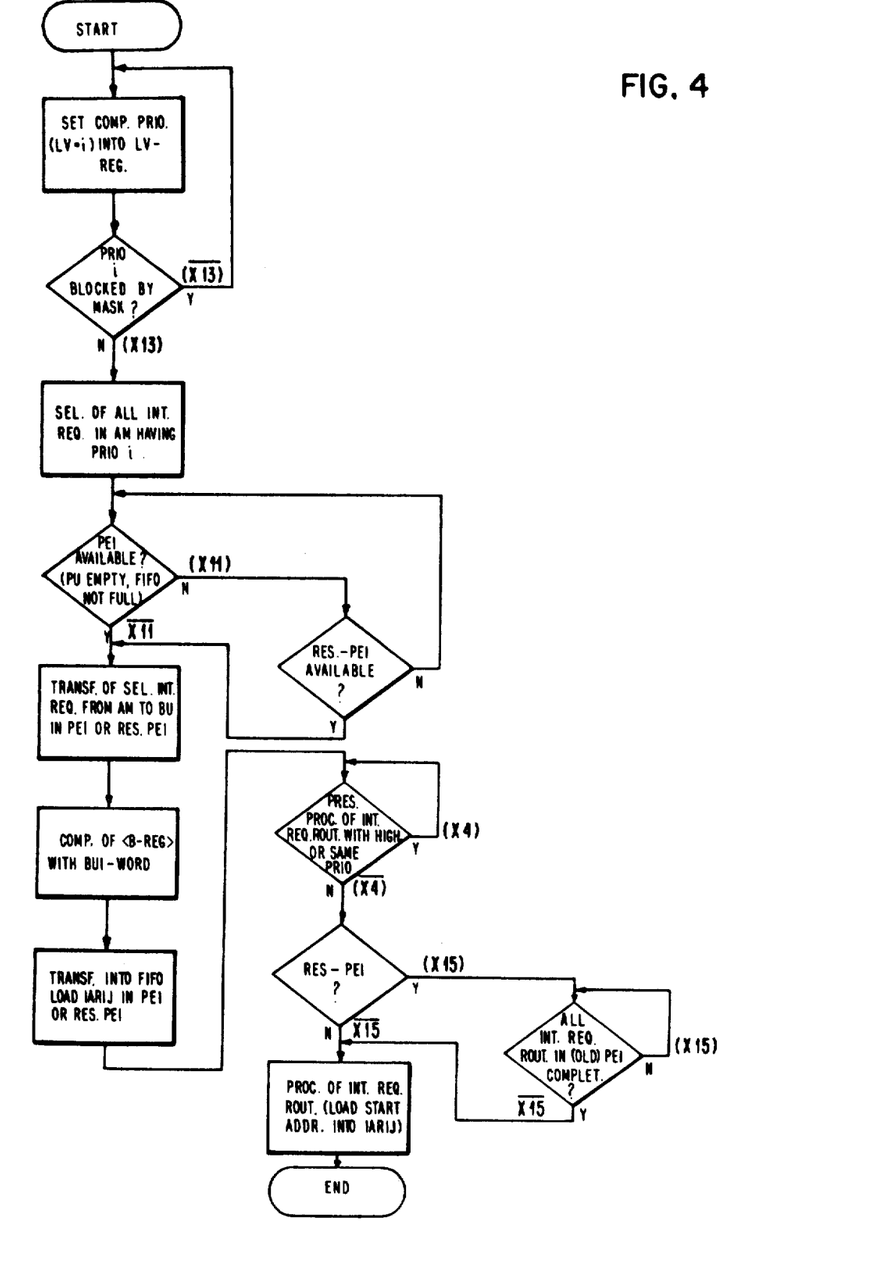
FIG. 4 contains a flow diagram illustrating operations of the subject device.

Relevant details of the foregoing preprocessing operations are shown in FIG. 4. Associated circuit details are shown in FIGS. 2 and 5 to 7. The following table lists the control signals which control the circuits of the device, the components to which they are applied, and the circuits by which they are generated. This table also shows the status of the controlled component, and the code name of each control signal. The legend below the table indicates the meanings of the abbreviated status notations.

TABLE OF CONTROL SIGNALS (FIG. 2)

| SYSTEM COMPONENT | STATUS | CODE | REFERENCE BIT | GENERATED BY |
|---|---|---|---|---|
| INT-REG (4) | E/NE | X1/$\overline{X1}$ | 2 (FIG. 3A) | SG (3) |
| AM (5) | F/NF | X2/$\overline{X2}$ | 2 (FIG. 3A) | SG (12) |
| AM-COMP. (5) | M/MM | X3/$\overline{X3}$ | 0,1,2 (FIG. 3A) | Hi (11) |
| PE | B/NB | X4/$\overline{X4}$ | — | CU (9) |
| P-REG (13) | S/RS | X5/$\overline{X5}$ | — | SG (14) |
| COMP (19) | M/MM | X6/$\overline{X6}$ | 0,1 (FIG. 3A) | COMP (19) |
| BU (15) | E/NE | X7/$\overline{X7}$ | 2 (FIG. 3B) | SG (20) |
| FIFO | E/NE | X8/$\overline{X8}$ | 0 (FIG. 3C) | SG (24) |
| FIFO | F/NF | X9/$\overline{X9}$ | 0 (FIG. 3C) | SG (23) |

TABLE OF CONTROL SIGNALS (FIG. 2)-continued

| SYSTEM COMPONENT | STATUS | CODE | REFERENCE BIT | GENERATED BY |
|---|---|---|---|---|
| IAR | E/NE | X10/$\overline{X10}$ | — | SG (23,29,30) |
| RES-PE | NC/NNC | X11/$\overline{X11}$ | — | CU (9) |
| OPE-REG | S/RS | X12/$\overline{X12}$ | — | SG (31) |
| SV-MASK | NEF/EF | X13/$\overline{X13}$ | — | SV (6) |
| B-REG | S/RS | X14/$\overline{X14}$ | — | SG (17) |
| RPE-REG | S/RS | X15/$\overline{X15}$ | — | SG (32) |
| PE | PR/NPR | X16/$\overline{X16}$ | — | CU (9) |

LEGEND:
B/NB—blocked/not blocked
E/NE—empty/not empty
EF/NEF—effective/not effective
F/NF—full/not full
M/MM—compared positive/negative
NC/NNC—necessary/not necessary
PR/NPR—processed/not processed
S/RS—set/reset As suggested in FIG. 2, the subject priority level-controlled device can service up to n+1 (in the present embodiment n=3) interrupt sources INT-S0 to INT-Sn which are coupled sequentially to ST via separate respective registers 0 to n and common register 4. It is of course possible, in principle, to perform this coupling function in parallel. For controlling transfers of requests into interrupt register 4 gates G10, G11, and G1n, interposed between respective registers 0, 1, 2 and n, are scanned sequentially by gate control signals τ0 to τn. Within ST the interrupt requests are held in associative memory 5.

As previously noted each interrupt request consists of a 2-bit field LV designating the interrupt level assigned to the associated source, a 1-bit field IB containing an interrupt bit indication, a 4-bit field SLVL designating an interrupt sublevel, and a 1-bit SB field for special usage. The interrupt bit IB and special bit SB are used to perform specific control functions, e.g. to derive control signals representing the status of different system components. To give an example: the interrupt bit field in the top stage of associative memory (AM) 5 is used for generating control signal X2 or $\overline{X2}$ indicating whether memory 5 is full (F) or not full (NF).

Figure 6:
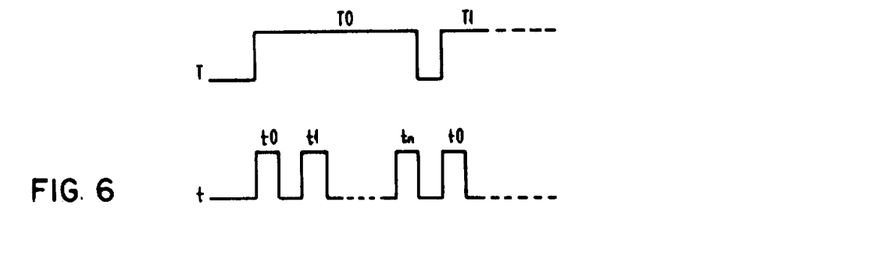
FIG. 6 contains a pulse waveforms demonstrating the time relation of two clock series T and t.
Figure 7:
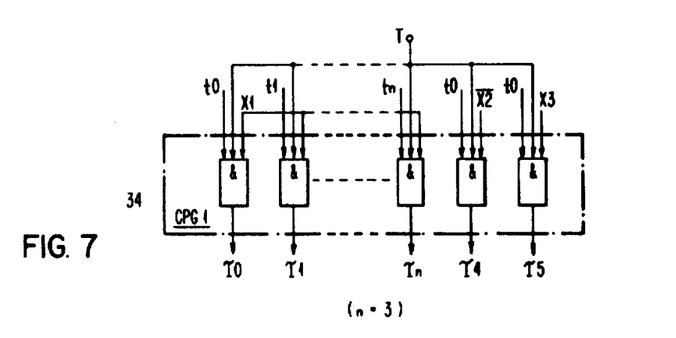
FIG. 7 contains block diagrams of two gate enable pulse generators.

As shown in FIGS. 2 and 7, gate control signals τ0 to τn are generated by means of clock signals T and t0 to tn, and control signal X1 generated by signal generator (SG) 3. The time relation of clock signals T and t0 to tn is shown in FIG. 6. Control signals X1 and $\overline{X1}$ are respectively generated by signal generator 3 when interrupt register 4 is respectively empty (E) and not empty (NE). The empty or not empty state of register 4 is represented by the presence or absence of an interrupt bit IB in register 4.

Interrupt requests are transferred from interrupt register 4 into associative memory 5 via gate G2 (FIG. 2). This gate is controlled by gate control signal τ4 generated by gate control signal generator (CPG1) 34 (FIGS. 2 and 7). This signal is raised at coincidence of clock signals T and t0 with control signal $\overline{X2}$ (see FIG. 7).

As previously noted, control signal X2 or $\overline{X2}$ indicates the full or not full status of associative memory 5, and is generated by a signal generator 3 responsive to an interrupt bit IB field in memory 5. Obviously, requests can be transferred from register 4 to memory 5 only when the latter is not full.

Control ST also comprises a mask circuit 6 (SV) associated with a mask register 7 (MA-REG), and a level register 8 (LV-REG).

Interrupt requests in memory 5 are pre-processed under control of a control unit (CU) 9 which itself is controlled by a control program contained in a control program storage (PS) 10. Control unit 9 initializes the system by loading interrupt/priority level information into the interrupt level registers (D-REG) 13 in the processing elements PEi, by setting to 0 the one-stage control registers RPE-REG and OPE-REG in each PE, by loading register 8 in control ST with e.g. the highest interrupt level and mask register (MA-REG) 7 with an intial mask.

The flexibility/adaptability of the present interrupt device derives from the co-operation of memory 5, controls 9, and masking circuit (SV) 6, the latter circuit controlling the assignments of levels to the processing elements PEi, if required, and the manipulation of interrupt levels through masks, if necessary.

Control unit 9 also supplies additional control signals, e.g gate control signals τL (FIG. 2) for activating gate G5 between interrupt level register 8 and both the masking circuit 6 and associative storage 5. In an unmasked operation interrupt requests stored in memory 5 are associatively searched for a match to the interrupt level LV currently stored in register 8. A hit indicator (HI) 11, connected to associative storage 5 responds to a match by generating control signal X3, and to a mismatch (or non-comparison) by generating control signal $\overline{X3}$.

Figure 3B:
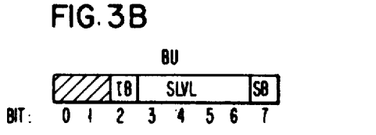
Figure 3C:
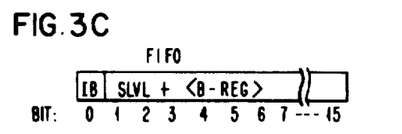
Figure 3D:
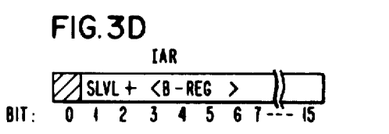

Interrupt requests coinciding with the level stored in register 8 are transferred through output gate G3 when signal X3 is generated by hit indicator 11. At such times gate enable pulse generator 34 (FIG. 7) generates gate control signal τ5 which enables gate G3. When gate G3 is operated, interrupt requests having the designated level (i) are transferred from memory 5 through main bus 38 (MB) into buffer (BU) 15 of the respective processing element PEi 38 whose interrupt level register 13 stores a value designating the associated level i. As shown in FIGS. 3A and 3B, bits 0 and 1 of the interrupt request which characterize the interrupt level field LV of the interrupt request, and which are transferred through interrupt register 4 and associative storage 5 are not transferred to buffer 15 (refer to FIG. 3B) since they are not required by the respective element PEi. Accordingly, buffer 15 receives only interrupt bit IB, interrupt sublevel field SLVL, and possibly special bit SB if it is required for specific control functions described later.

A transfer into buffer 15 of processing element PEi is permitted only when the element is not busy by a preceding operation, for in the latter case gate control signal τ6 for controlling gate G6 cannot be generated with gate enable pulse generator (CPG2) 37. As shown in FIG. 7 control signal τ6 is generated by coincidence of clock pulses T and t0, and control signals X5 (from signal generator 14, FIG. 2, when interrupt level register 13 is loaded), X6 (from comparator 19, FIG. 2, when the value stored in interrupt level register 13 equals the level value transferred with the request via main bus 38 into interrupt level register 18), X7 (from control signal generator 20, FIG. 2, when buffer 14 is empty), X11 (from control unit 9, FIG. 2, when the latter determines by means of control signals X10 or $\overline{X10}$ whether or not reference to a reserve processing unit RES-PE is necessary (NC), and a control signal X13 (from masking circuit 6 when masking is not effective (NEF)).

Buffer 15 has as many rows (words) as associative storage 5. Consequently, in cooperation with the F1FO stack 22 to which it is serially coupled it permits the respective processing element to service requests on the assigned interrupt level in excess of the capacity of memory 4. All interrupt requests then may be transferred, in a parallel by byte mode via gate G6, into buffer 15 of selected processing elements PEi.

Now assume that processing element PEi, associated with the currently compared interrupt level i, can receive a new interrupt request. In a following step it tests the occupancy status of its base address register (B-REG) 16 by causing control signal generator 17 to produce control signal X14 if a base address is prepared in register 16, or control signal $\overline{X14}$ if this register is empty. As pointed out above, signal generator 20 generates an output signal X7 when buffer 15 is empty, and a control signal $\overline{X7}$ when buffer 15 is not empty. The coincidence of control signals $\overline{X7}$ and X14 means that input registers A and B of arithmetic and logic unit (ALU) 21 contain, e.g. as values to be added, a base address from base address register 16 and an interrupt sublevel of an associated interrupt request from buffer 15. In that case, control signal pulse τ7, generated by gate enable pulse generator 37 (see FIG. 7), causes arithmetic and logic unit 21 to combine these two input values and latch the result in its output register O-REG.

The real address thereby formed is transferred from O-REG into FIFO stack 22, via gate G7, when the conditions for generation of gate control signal τ8 are satisfied; e.g. when control pulse generator 23 has generated output signal $\overline{X9}$ which, with reference to the Table of Control Signals supra, indicates that the stack is not full (NF). As shown in FIG. 7, control signal τ7 is generated upon coincidence of a T clock pulse, a t0 clock pulse, a control signal $\overline{X7}$ and a control signal X14. The information thereby entered into F1FO stack 22, which is the real address of the first instruction of an interrupt routine, has the format shown in FIG. 3C; i.e. the sum of a base address (derived from base address register 16) and the interrupt sublevel field SLVL of a respective interrupt request.

Before such real addresses of respective first instructions of interrupt routines can be transferred, via gates G80 to G8K(FIG. 2), into instruction address registers 25 to 27 (IAR 0 to IAR k), a test is made to determine if these instruction address registers do or do not contain previously loaded addresses. For that purpose, signal generators 28 to 30 are operated to generate control signals X10/0 to x10/k, or $\overline{X10/0}$ to $\overline{x10/k}$ when these registers are empty and not empty, respectively. The respective control signals are used (FIG. 7) to form gate control signals τ9/0 to τ9/k which allow gates G80 to G8k to load respective instruction address registers IAR 0 to IAR k.

As shown in FIG. 7, the generation of the above-mentioned gate control signals requires a clock pulse T, clock pulses t0 to tk, control signals $\overline{X8}$ and X10/0 to x10/k. The control signal X8 or $\overline{x8}$ is produced by signal generator 24 (FIG. 2) in response to interrupt bits stored in stack 22 indicating whether the stack is empty or not empty.

The number k of parallel instruction address registers provided in a processing element should correspond to the number of the following processing units or processors provided e.g. in a multi-processor system.

However, before beginning the processing of an interrupt routine some additional operating conditions have to be examined. As shown in FIG. 2, real addresses are released for transfer from the instruction address registers to the control systems of connected processors by means of gate control signals τ10/0 to τ10/k produced by generator 37. FIG. 7 shows that these gate control signals are conditioned on clock signals T and t0 to tn, and control signals X4 and X12. Control signal X4 and $\overline{X4}$, generated by control unit 9, indicate the accessibility status of the respective processing element, i.e. whether or not it is blocked (blocked for example because interrupt requests of a higher interrupt level are being processed at the moment).

The above specified operation could be called a standard or non-exceptional operation. By comparison a non-standard or exceptional operation is illustrated in the middle one of the three diagrams of FIG. 8. However, before explaining this operation reference is first made to the standard operation as shown in the upper diagram of FIG. 8

Figure 8:
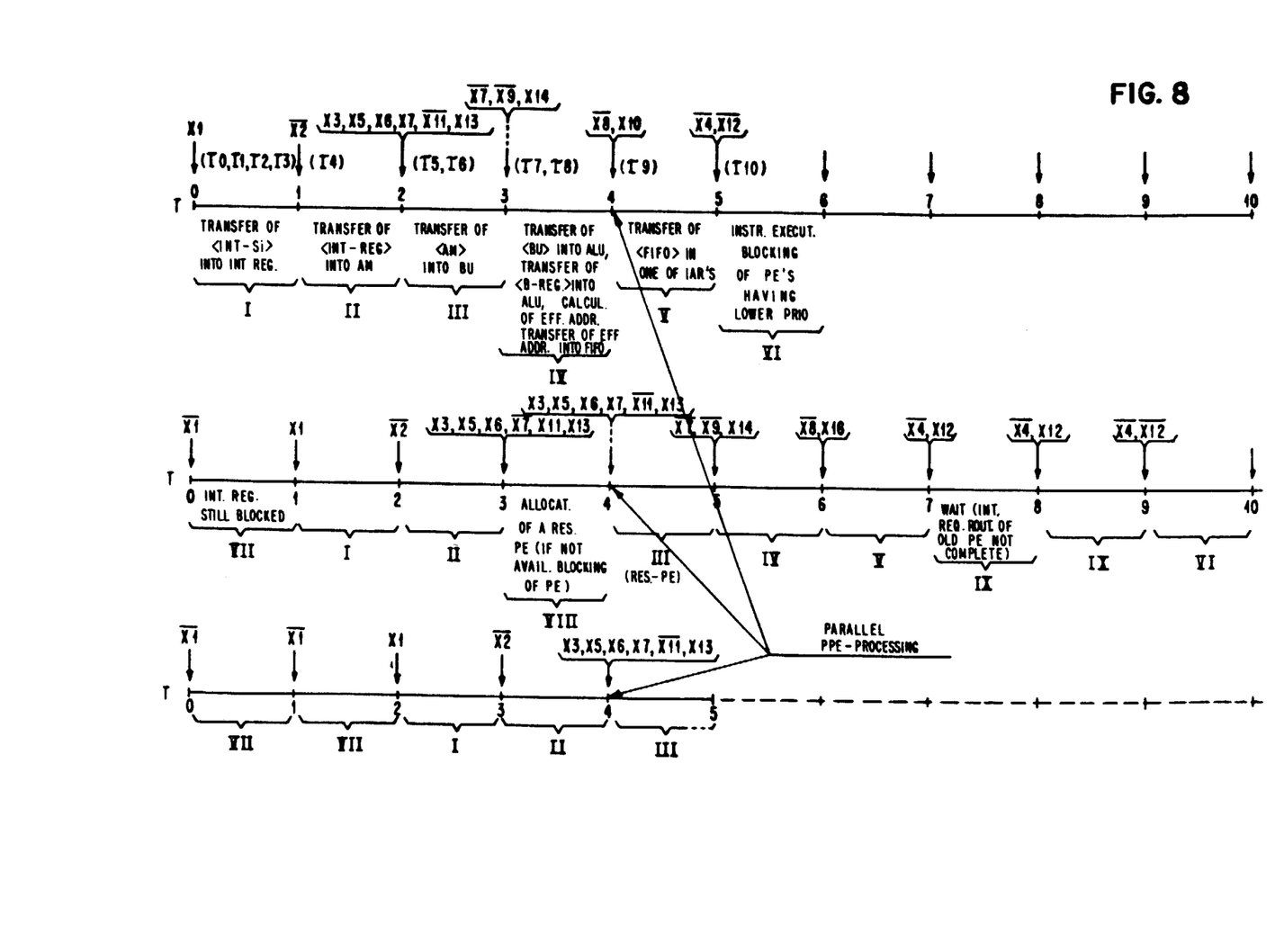
FIG. 8 contains flow diagrams illustrating concurrent handling of several interrupt processing operations in several respective processing elements.

FIG. 8 is to be viewed in connection with FIGS. 2 and 7. In cooperation with gate control signals τ0 to τ3, control signal X1 invokes operating step I for transferring requests from the various interrupt sources into interrupt register 4. Then step II is invoked by control signal $\overline{X2}$ and τ4 for transferring the request into memory 5.

Then step III is performed to transfer selected contents of the memory 5 into buffer 15 of a selected processing element PEi under control of control signals X3, X5, X7, $\overline{X11}$ and X13 in conjunction with timing signals τ5 and τ6.

Then step IV transfers the contents of buffer 15 together with a base address through the arithmetic and logic unit of the processing element, to produce the effective address, which is stored in stack 22 of that element. This operating step is controlled by signals $\overline{X7}$, $\overline{X9}$, X14, and gate control signals τ7 and τ8.

When stack 22 contains an effective instruction address, step V transfers such an address into an instruction address register IAR. The necessary criteria are the presence of control signals $\overline{X8}$ and X10 which lead to the generation of gate control signal τ9.

In the last operating step VI of standard operation an instruction in the interruption handling program is located via passage of the initial instruction address of an interrupt routine to the associated processor, and executed while transfers from processing elements with lower interrupt levels are blocked.

In the operation according to the middle diagram of FIG. 8 steps I and II are preceded by a previously undiscussed operating step VII associated with a blocking of transfers of interrupt requests into interrupt register 4 because control signal $\overline{X1}$ signifies that this register is not yet empty. When register 4 becomes accessible, steps I and II are performed as explained previously.

Subsequently, another "non-standard" operating situation, characterized as operating step VIII, allows for loading of a reserve processing element because the associated primary processing element is fully loaded. Even if a reserve processing element is not available the respective primary processing element should be blocked in this operating step VIII. This operating situation is characterized first by control signal $\overline{X7}$ which is generated when the buffer of the processing element is not yet quite empty. Furthermore, control signal X11 is generated which characterizes an operating status requiring a reserve processing element.

There follow the above described operating steps III to V which however in the present case refer to the reserve processing element rather than to the primary processing element.

As shown in the middle diagram of FIG. 8 the step VI which normally would immediately follow step V, i.e. the execution of instructions and the blocking of lower priority processing elements, may be delayed by one or more "idling" steps IX each having a T clock time duration. This delay is required when the interrupt requests still queued in the primary processing element have not yet been fully processed. The idling step IX is dependent on control signals $\overline{X4}$ and X12. Its duration is determined by control signal X12 which is produced by signal generator 31 (FIG. 2) when the OPE register is set. Control unit 9 sets this register via a control signal X16 and the register is reset (control signal $\overline{X12}$) only when all interrupt requests of the primary processing element have been processed, that causing control unit 9 to produce control signal $\overline{X16}$.

If the OPE register is still set (control signal X12) at the next T clock time the reserve processing element has to wait again for the processing of its first interrupt request. As shown in FIG. 8, this is only possible at T clock time 9, when control signal $\overline{X12}$ is produced. At this time operating step VI can be executed.

The lower diagram in FIG. 8 shows how in the initial phase, due to unavailability of the interrupt register, operating steps VII are repeated until control signal X1 indicates that the interrupt register is ready to receive a new interrupt request from the interrupt sources.

Arrows in FIG. 8 indicate how parallel pre-processing is achieved in the total of all processing elements.

Below, reference will be made to some specific features of control ST in FIG. 2 which are processed by the operating system of control unit 9. Furthermore, the function of control unit 9 in connection with its program storage 10 and masking circuit 6 can also be controlled by the operating system of one of the connected processors and therefore does not absolutely have to be provided as a separate unit. Reference is also made to the fact that control signals directed by the individual processing elements PE0 to PE1 towards control unit 9, as e.g. control signals X10/0 to X10/k, X9 and $\overline{X9}$ would have to be individually marked with respective identification indicia to identify the processing elements from which they originate. The same applies for control signals which are derived from specific operating situations and from the above-mentioned control signals, and which are directed from control unit 9 to individual processing elements, since these would equally have to be marked with the identifying indicia of those processing elements to which they are individually directed. However, to simplify the specification, these details in the marking of the control signals have been omitted in FIGS. 1, 2, 7 and 8, the more so as FIGS. 2 and 7 show in detail only the conditions for processing element PE0.

At the beginning of initialization, there exist in the interrupt control only so-called neutral processing elements (neutral PE), i.e. such elements which have not yet been allocated to an interrupt level LV. Neutral processing elements are recognized as such by their RPE registers, OPE registers and D registers all being set to 0.

As pointed out at the beginning of the specification, the initialization phase comprises the setting of the D registers with the information of interrupt levels LV which are to be allocated to respective processing elements.

Such processing elements whose D-registers are now loaded with interrupt levels, and in which the RPE-register and the OPE-register are still set to 0, are called standard processing elements (standard PE).

If, due to an overflow of other kind of blocking condition, a reserve processing element must be added to an overflowing standard processing element the interrupt level which had been allocated to the overflowing element is read into the D-register of a neutral processing element which is then characterized as a reserve processing element by a "1" set into its RPE-register. The RPE-register in the standard element remains reset to 0.

However, the overflowing, standard processing element connected to a reserve processing element must then be characterized as an *old* processing element to make sure that interrupt requests of this interrupt level queued in the reserve element are not processed until those in the old element have been fully processed.

A characterization for such an old processing element (old PE) is an OPE-register set to 1, an RPE-register reset to 0, and a D-register loaded with the corresponding interrupt level.

The operating system carries out this control function e.g. by preparing lists of free processing elements and such processing elements which cause an overflow.

The blocking of processing elements with lower interrupt levels, performed in operating step VI (FIG. 8), can be effected by means of known priority control circuits operating to generate signal X4 or $\overline{X4}$.

Figure 5:
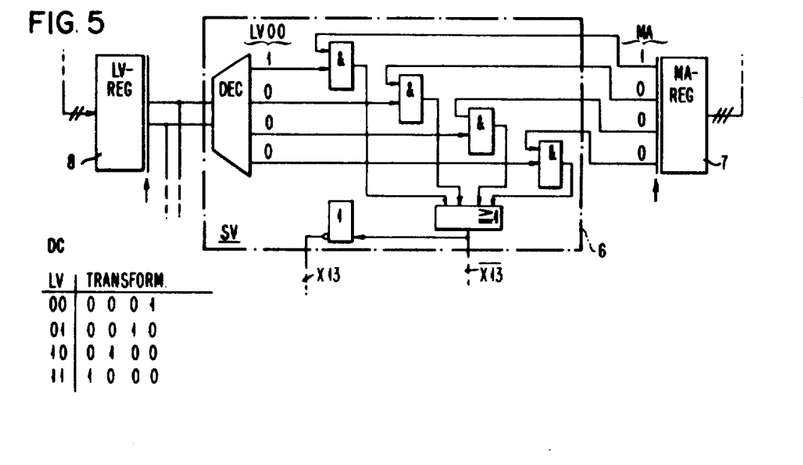
FIG. 5 contains a block diagram of a mask circuit and a transformation table.

Finally, FIG. 5 shows a basic circuit diagram of masking circuit 6 which is represented in FIG. 2 and which with its control signals $\overline{X13}$ or $\overline{X13/0}$ to $\overline{X13/1}$ is in the position of preventing the associative search operation with respect to an interrupt level characterized by a mask. With reference to signals $\overline{X13/0}$ to $\overline{X13/1}$ it is pointed out that these are generated individually by control ST for the various processing elements PE0 to PE1. Masking circuit 6 substantially consists of a decoder DEC for transforming the interrupt level code LV into another code represented in the lower part of FIG. 5. Furthermore, it includes four AND gates whose outputs are ORed together to produce control signal $\overline{X13}$.

Each AND gate has two inputs, one connected to an output line of the decoder and the other to an output of mask register 7. In the embodiment of FIG. 5 therefore priority level 00 is blocked by a mask with form 1000 since the AND condition for the AND gate in the upper left is satisfied. In this manner, control signal $\overline{X13}$ is generated which indicates that interrupt level masking is effective.

Control signal X13 is generated by means of an inverter I connected at the output of the above-mentioned OR gate.

While we have illustrated and described preferred embodiments of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by Letters Patent is:

1. A priority level controlled interrupt handler unit for pre-processing interrupt requests from plural interrupt sources having different assigned priorities, said unit including plural processing elements (PE) having means for comparing an interrupt priority level prealocated to the unit with an interrupt level of an incoming interrupt request, means for buffering incoming interrupt requests when a comparison match occurs, means for generating and buffering real addresses associated with incoming requests, each address designating a starting address of a routine for servicing the respective incoming request, and at least one instruction address register means in which real addresses are staged for initiating servicing routines, wherein the improvement comprises, common control means (6 to 10; FIG. 2) for initializing said unit by assigning interrupt levels (LV) to said processing elements and for establishing level masking conditions (MA), and for producing control signals (e.g. X4/$\overline{X4}$, X11/$\overline{X11}$, X16/$\overline{X16}$) from which other control signals (e.g. X5/$\overline{X5}$, X9/$\overline{X9}$, X10/$\overline{X10}$, X12/$\overline{X12}$, X15/$\overline{X15}$) are generated individually in the processing elements, associative storage means (5) in said common control means and a main bus (38) connecting the output of the associative storage means to all PE's, means for storing interrupt requests in the associative storage means, each request including an interrupt level, and for selecting requests for transfer to a PE by means of an associative search operation relative to an associated interrupt level (e.g. LV=i) designated by the common control means, control registers (RPE, OPE) in each processing element and means connecting the control registers to be set by the common control to show the status of each PE as neutral, standard, reserve, or old, the old status identifying a PE having an overflow in its means for storing interrupt requests, means for indicating when a standard processing element associated with a specific interrupt level (i) overflows, or is otherwise blocked, and means in the common control for selecting and assigning a neutral PE as a reserve processing element for that level, and blocking means (X4, X16) in the common control for blocking servicing of interrupt requests which are queued in PE's having assigned level priorities lower than requests currently being serviced or, if a reserve PE has been allocated to a current interrupt level, for blocking the processing of the interrupt requests in that reserve PE until all interrupt requests of the old PE assigned to said current level have been processed.

2. The interrupt handler unit as defined in claim 1,
wherein said common control means includes a clock generator (35) provided in the control (ST; FIG. 2) which generates clock signals (T, t) for controlling the timing of operations in this control as well as in the individual processing elements (PE0 to PE1) and a gate enable pulse generator (34) which controls the transfer of interrupt requests from plural request sources (0 to n) into an interrupt register (4), from the interrupt register to associative storage (5) and from the associative storage to the processing elements; and wherein each processing element includes, a base address register (16) for receiving a base address from the common control, a buffer (15) for buffering interrupt requests transferred from the associative storage (5), an arithmetic and logic unit (21) for combining the base address and a priority sublevel function defined in the interrupt request in the buffer in accordance with a predetermined function (e.g. addition) to product a real address, a stack of storage locations 22 operating as a second buffer for buffering the real addresses computed by the arithmetic and logic unit, at least one instruction address register (25 to 27) for receiving real addresses one at a time from the stack for transfer to a connected processor for further processing, and a gate enable pulses generator (37) which in response to the clock signals (T, t) and control signals (X4 to X14) produced in part by the common control, and in part by the processing element itself, generates gate control signals which control the transfer of interrupt requests from the associative storage means via a main bus (38) into the respective buffer, the operations of the arithmetic and logic unit for producing real addresses, the transfers of real addresses from the arithmetic and logic unit into the stack, the transfer of real addresses from the stack into individual instruction address registers, and finally the transfers of real addresses from the instruction address registers into connected processors.

3. Device as claimed in claim 2,
wherein said common control and said processing elements include:
signal generators (3, 11, 12, 14, 17, 20, 23, 24, 28 to 30, 31 and 32) for producing control signals for application to the gate enable pulse generators (34, 37) for processing together with the signals of the clocks (T, t) into gate control signals ($\tau 0$ to $\tau 10/k$).

4. Device as claimed in claim 1,
wherein the common control (6 to 10) contains tables of the operating states of the processing elements including lists of the actually existing neutral, standard, reserve, and old PE's, control registers (RPE and OPE) in the processing elements, and means in the common control for setting said control registers for the allocation of reserve processing elements and for the blocking of reserve elements.

5. Device as claimed in claim 1, wherein an interrupt request has an interrupt priority level and an interrupt priority sublevel and,
including a masking circuit (6) connected between the control unit (9) and the associateive storage (5)

for modifying individual bits of the interrupt level and of the interrupt sublevel of a received request according to an applied mask (MA) in such manner that its processing is blocked, or its priority is increased or decreased, or its real address is modified.

6. Device as claimed in claim 1, characterized in that the processing elements (PE0 to PE1) are provided on plug-in cards adaptable for extension by plugging into further processing elements (PE1+1, PE1+2 . . . ) whereby additional interrupt levels are serviceable if needed.

* * * * *